United States Patent [19]

Gauthier

[11] Patent Number: 4,520,236

[45] Date of Patent: May 28, 1985

[54] SOUND TRANSFER FROM A HEARING AID TO THE HUMAN EAR DRUM

[75] Inventor: Edouard A. Gauthier, El Cajon, Calif.

[73] Assignee: Nu-Bar Electronics, San Diego, Calif.

[21] Appl. No.: 556,604

[22] Filed: Nov. 30, 1983

[51] Int. Cl.$^3$ .............................................. H04M 1/04

[52] U.S. Cl. .................................... 179/107 E; 381/69

[58] Field of Search ................ 381/68, 69; 179/107 E, 179/107 R; 181/151, 155, 156

[56] References Cited

U.S. PATENT DOCUMENTS

| | | | |
|---|---|---|---|
| 3,209,082 | 9/1965 | McCarrell | 179/107 E |
| 3,408,461 | 10/1968 | Langford | 179/107 E |
| 3,890,474 | 6/1975 | Glicksberg | 179/107 E |

FOREIGN PATENT DOCUMENTS

| | | | |
|---|---|---|---|
| 1071892 | 12/1959 | Fed. Rep. of Germany | 179/107 E |
| 1270616 | 6/1968 | Fed. Rep. of Germany | 179/107 E |
| 52-37421 | 3/1977 | Japan | 179/107 E |

*Primary Examiner*—Forester W. Isen

*Assistant Examiner*—L. C. Schroeder

*Attorney, Agent, or Firm*—Frank D. Gilliam

[57] ABSTRACT

An improved in-the-ear hearing aid. The earmold is divided into two separate chambers defined by a divider wall. A first chamber has an opening adjacent the outer ear and the second chamber has an opening adjacent the ear drum. A microphone is positioned adjacent the first chamber opening. An amplifier and a battery for its power source are located within the first chamber. A receiver with a sound emitting aperture is located within the second chamber. The sound emitting aperture is directed toward the divider wall. The receiver is completely surrounded by an acoustic resistance material which separates the receiver from the walls of the chamber. The microphone, amplifier, battery and receiver are electrically interconnected for supplying to the receiver amplified microphone signals. The combination of the dimensions of the chamber and the acoustic material provide a horn effect to the receiver produced sound. The opening of the second chamber may be covered with a removable grill.

16 Claims, 3 Drawing Figures

SOUND TRANSFER FROM A HEARING AID TO THE HUMAN EAR DRUM

BACKGROUND OF THE INVENTION

The present invention relates generally to hearing aids and more particularly to an in-the-ear miniaturized hearing aid of the type that has all of its electrical and mechanical elements, including a replaceable battery, contained within an earmold small enough to be positioned substantially within the ear canal.

Many different types and designs of hearing aids are presently available to assist person having hearing deficiencies. Such hearing aids typically incorporate a microphone for converting sound waves to an electrical signal which is amplified by an amplifier and a receiver for converting the amplified electric signal into amplified sound waves which are directed to the ear drum.

Miniaturization of electronic components and batteries has made possible the production of "integrated" hearing aids having all of the necessary components incorporated in a single earmold worn substantially within the ear canal. Integrated hearing aids of this type are desirable because they are lightweight and convenient to use and because they have the cosmetic advantage of being inconspicuous.

Generally in hearing aids of this type the receiver is positioned remote from the opening through the inner most tip of the earmold which is adjacent to the ear drum. The sound from the receiver is generally piped via small tubing to the earmold's inner most tip opening adjacent the ear drum.

This tubing creates several problems. Because the receiver and tube are physically attached in some way to the earmold, the mechanical vibrations generated by the receiver are transmitted directly to the earmold through both the receiver-to-earmold attachment and the tubing-to-earmold attachment. These mechanical vibrations travel through the earmold to the microphone resulting in feedback. The tubing being small in diameter is easily blocked by wax build-up preventing satisfactory hearing aid operation.

The material used to construct the tubing has a degree of acoustic transparency which further increases the aforementioned feedback problem.

Further, the tubing, because of its uniformly small diameter, does not perform satisfactory as an acoustic horn. This results in an undesirable overall frequency response.

There is a continuing need in the hearing aid art for further miniaturization, less feed back, reduced wax buildup and improved frequency response.

SUMMARY OF THE INVENTION

The present invention is an in-the-ear miniaturized hearing aid. An earmold for containing the electrical and mechanical components of the device is provided with two separate chambers. A first outer chamber with an opening to the exterior of the earmold and a second inner chamber with an opening adjacent to the ear drum. A divider wall separates the two chambers. A microphone is positioned adjacent the first chamber opening to receive exterior sounds. Positioned within the second chamber is a receiver with a sound emitting opening directed toward the divider wall. The receiver, including the second emitting opening, is encased by foam acoustic material. In effect the receiver is suspended within the second chamber by the foam material.

The foam acoustic material in addition to isolating the receiver from the chamber walls, acts as an acoustic resistor which in combination with the interior design of the second chamber acting as an acoustic horn, determines the frequency response of the hearing aid. Accordingly, a selected internal second chamber configuration and selected foam material can enhance the frequency response of the hearing aid.

The amplifier and its associated battery are positioned within the first chamber. The amplifier is interconnected electrically to the microphone, battery and receiver so that sound waves received by the microphone are amplified at the receiver opening. The electrical connection between the amplifier and receiver pass through small apertures in the divider wall.

A grill may be used to cover the opening between the second chamber and the ear drum to reduce wax buildup in the second chamber.

It is an object of this invention to provide an improved in-the-ear hearing aid.

Another object of this invention is to provide a hearing aid with enhanced frequency response.

Still another object of this invention is to provide a hearing aid with reduced wax build-up so that use periods between cleaning can be extended.

A still further object of the invention is to provide a hearing aid where wax build-up is easily removed.

These and the other objects of the invention will become apparent to those skilled in the art on consideration of the accompanying specification, claims and drawings.

DETAILED DESCRIPTION OF THE PREFERRED EMBODIMENT

Figure 1:
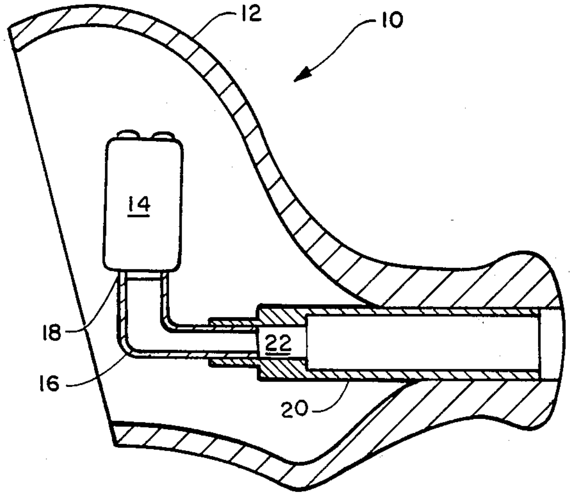
PRIOR ART FIGURE 1
FIG. 1 is a schematic cut-away showing of one embodiment of a prior art device.
Figure 2:
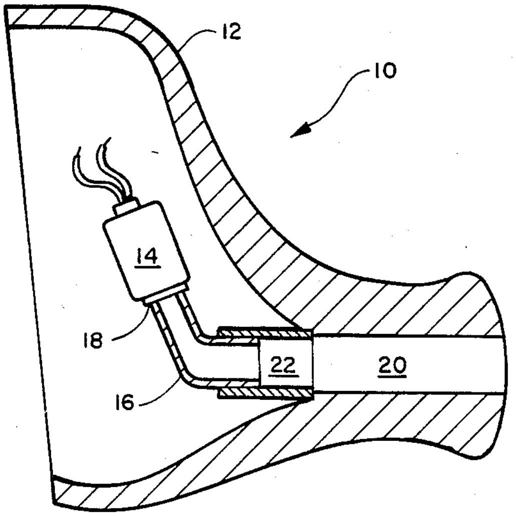
PRIOR ART FIGURE 2
FIG. 2 is a schematic cut-away showing of a second embodiment of a prior art device.

FIGS. 1 and 2 depict prior art devices. The device 10 of FIG. 1 includes a typical earmold 12 containing a receiver 14 mounted therein. A first small diameter tubing 16 leads from the sound emitting opening 18 of the receiver to one end of a second tube 20 with a larger diameter. Between the small tubing 16 and the larger diameter tubing 20, there is positioned an acoustic resistor 22. The combination of the two tubes 16 and 20 which form the acoustic horn and the acoustic resistor 22 determine the frequency response of the device 10. The frequency response of this prior art device is very favorable.

The problems directed to feedback and ear wax build-up aforementioned are, however, present in this device. As can be appreciated, the larger diameter tube 20 is still relatively small in diameter and can easily be blocked by ear wax, and both the receiver 14 and the larger diameter tube 20 are physically connected to the earmold 12, thereby transmitting mechanical vibrations to the microphone (not shown) causing unwanted feedback.

The FIG. 2 prior art device operates on the same principle as the FIG. 1 device. In the FIG. 2 device the first tube 16 is smaller in diameter than the equivalent tube of the FIG. 1 device. The tube 20 is smaller in diameter and shorter in length than the equivalent tube of the FIG. 1 device. The two designs have different frequency responses do to the different physical size of the tubing 16 and 20. The FIG. 2 device has the same feedback problem as the FIG. 1 device and has an increased potential for wax build-up because of the physical size of tube 20.

Figure 3:
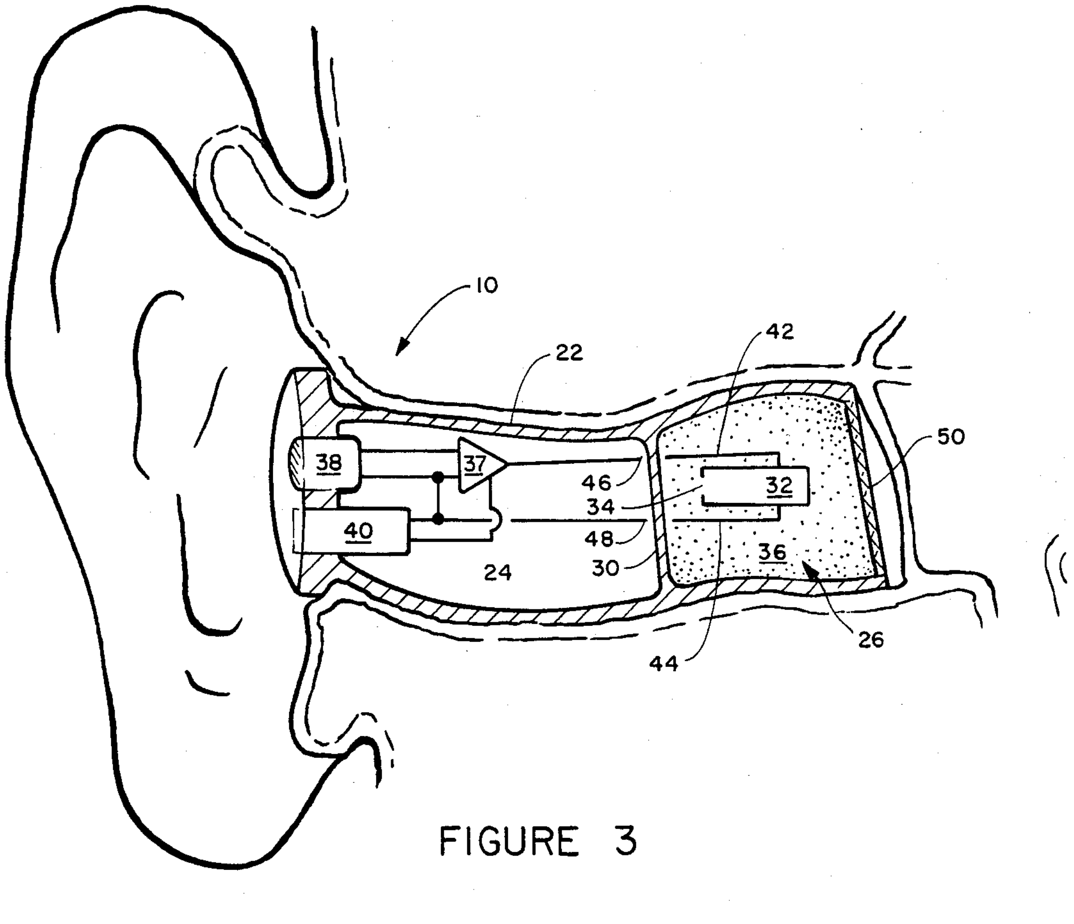
FIG. 3 is a schematic cut-away showing of a device of the invention.

Referring now to device of the instant invention shown in FIG. 3. Like the previously described devices, the device of the invention includes an earmold 22 configured to snugly fit in the ear canal of the wearer. The earmold has two separate chambers 24 and 26. Chamber 24 has an opening 28 to the exterior of the device.

The chamber 26 has an opening adjacent to the ear drum of the wearer. A wall 30 separates the Chamber 24 and 26. The wall 30 is constructed of the same material as the earmold 22 and is formed during the forming of the earmold. Positioned within the chamber 26 is a receiver 32. The receiver 32 has a sound emitting opening 34 which is directed toward the divider wall 30. Surrounding the receiver 32 is an acoustic foam material 36. This material 36 is packed around the receiver including the sound emitting opening 34 and suspends the receiver within the chamber 26. In this manner the receiver has no physical contact with the earmold which substantially prevents mechanical vibrations of the receiver from being transmitted to the earmold, thereby preventing feedback from this source.

The amplifier 37 which includes a conventional output audio level control (not shown), the microphone 38 which is positioned adjacent the opening 28, and the battery 40 for powering the amplifier are all located within the chamber 24.

The microphone, amplifier, battery and receiver are well known in this art and therefore, will not be described with any detail.

The microphone, amplifier, battery and receiver are electrically interconnected in a conventional known manner. The electrical connections 42 and 44 between the amplifier and battery to the receiver pass through apertures 46 and 48 in divider wall 30. These apertures 46 and 48 may be either sealed with the interconnecting wires through or left unsealed. Preferably the openings are sealed. Because of the physical dimensions of the apertures 46 and 48, they have little effect on the frequency response of the device.

The interior dimensions of chamber 26 which form the acoustic horn for the device can be selected along with the type of acoustic foam material to provide improved frequency response of the device of the present invention over the prior art devices.

A grill or screen 50 may be used to cover the open end of chamber 26 adjacent the ear drum to collect ear wax and prevent its entry into the chamber and foam material. The grill or screen is made easily removable from the hearing aid for the purpose of cleaning or replacement. The cleaning or replacement of the grill or screen could be accomplished in a very short time when compared to the cleaning of the tubes of the prior device and also no damage could occur to the receiver while cleaning the grill or screen.

It should be apparent that it is almost impossible for wax build-up to close off the sound emitting opening 34 of the receiver of the present invention even though the receiver is positioned relatively close to the ear drum do to the placement of the sound emissions opening adjacent the divider wall 30 and remote from the opening adjacent the ear drum.

The acoustic foam material 36 may be constructed of Polyurethane-polyester material or material having the same or similar characteristics.

It is to be understood that the present embodiments of this invention described above are merely illustrative of applications of the principals of this invention. A variety of other arrangements could similarly be employed to instrument this invention without departing from the true spirit and scope thereof.

What is claimed is:

1. An improved miniaturized hearing aid comprising:

An earmold adapted to be fitted into the ear channel, said earmold having two separated chambers, a first chamber with an opening to the exterior of the ear and a second chamber with an opening adjacent the ear drum, said chambers are separated by a divider wall;

a microphone positioned adjacent said opening in said first chamber;

a receiver having a good emitting aperture positioned within said second chamber with said sound emitting aperture directed toward said divider wall;

an amplifier means positioned within said first chamber and interconnected between said microphone and said receiver means for supplying to said receiver amplified microphone signals;

a battery for powering said amplifier means; and isolation means surrounding said receiver means including said sound emitting aperture.

2. The invention as defined in claim 1, wherein the interconnection means between said amplifier means and said receiver passes through apertures in said divider wall.

3. The invention as defined in claim 1, wherein said second chamber provides a horn effect for the sound emitted from said receiver aperture.

4. The invention as defined in claim 1, additionally comprises a removable grill member positioned across said opening in said second chamber.

5. The invention as defined in claim 5, wherein said removable grill means includes a disposable cloth member.

6. The invention as defined in claim 1, wherein said isolation material is foam.

7. The invention as defined in claim 6, wherein said foam is polyurethane-polyester.

8. The invention as defined in claim 1, wherein said isolation means functions as an acoustic resistor.

9. An improved receiver for a miniaturized hearing aid comprising:

a partially enclosed chamber open to the ear drum along one surface thereof;

a receiver having a good emitting aperture positioned within said chamber with said sound emitting aperture directed to the wall of said chamber opposite said surface adjacent said ear drum; and isolation means surrounding the entire receiver.

10. The invention as defined in claim 9, wherein said receiver is interconnected to the output of said miniaturized hearing aid through a wall of said chamber.

11. The invention as defined in claim 9, wherein said enclosed chamber provides a horn effect for the sound emitted from said receiver aperture.

12. The invention as defined in claim 9, additionally comprising a removable grill member positioned across the chamber opening adjacent said ear drum.

13. The invention as defined in claim 12, wherein said grill member includes a disposable cloth member.

14. The invention as defined in claim 9, wherein said isolation material is foam.

15. The invention as defined in claim 14, wherein said foam is constructed of polyurethane-polyester.

16. The invention as defined in claim 9, wherein said isolation means functions as an acoustic resistor.

* * * * *